United States Patent
Yuan et al.

(10) Patent No.: US 7,035,763 B2
(45) Date of Patent: Apr. 25, 2006

(54) SYSTEMS AND METHODS FOR SELECTING TRAINING DATA AND GENERATING FAULT MODELS FOR USE IN USE SENSOR-BASED MONITORING

(75) Inventors: Chao Yuan, Plainsboro, NJ (US); Claus Neubauer, Monmouth Junction, NJ (US); Hans-Gerd Brummel, Orlando, FL (US); Ming Fang, Princeton Junction, NJ (US); Zehra Cataltepe, Fair Haven, NJ (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/932,577

(22) Filed: Sep. 2, 2004

(65) Prior Publication Data

US 2005/0049827 A1    Mar. 3, 2005

Related U.S. Application Data

(60) Provisional application No. 60/500,779, filed on Sep. 5, 2003, provisional application No. 60/499,748, filed on Sep. 3, 2003, provisional application No. 60/499,749, filed on Sep. 3, 2003.

(51) Int. Cl.
*G06F 15/00* (2006.01)
*G06F 19/00* (2006.01)

(52) U.S. Cl. ..................... 702/179; 700/108

(58) Field of Classification Search ............... 702/179, 702/185, 199; 706/907; 700/108
See application file for complete search history.

(56) References Cited

U.S. PATENT DOCUMENTS

| 4,283,634 A | * | 8/1981 | Yannone et al. ......... 290/40 R |
| 5,544,320 A | | 8/1996 | Konrad |
| 6,175,934 B1 | | 1/2001 | Hershey et al. |

(Continued)

FOREIGN PATENT DOCUMENTS

EP    1 006 446 A2    6/2000

OTHER PUBLICATIONS

Li et al., Vector-Based Approach Towards Isolation of Sensor Faults in Dynamic Systems, 2001 IFAC.*

(Continued)

*Primary Examiner*—Bryan Bui
*Assistant Examiner*—Toan M. Le

(57) ABSTRACT

A system for generating a sensor model for use in sensor-based monitoring is provided. The system includes a segmenting module for segmenting a collection of sensor vectors into a plurality of bins comprising distinct sensor vectors. The system also includes a set-generating module for generating a set of statistically significant sensor vectors for each bin. The system further includes a consistency determination module for generating at least one consistent set of sensor vectors from the sets of statistically significant sensor vectors. Additionally, the system includes a model-generating module for generating a sensor model based upon the at least one consistent set.

22 Claims, 5 Drawing Sheets

U.S. PATENT DOCUMENTS

| | | |
|---|---|---|
| 6,246,972 B1 * | 6/2001 | Klimasauskas ................. 703/2 |
| 6,343,251 B1 | 1/2002 | Herron et al. |
| 6,438,484 B1 | 8/2002 | Andrew et al. |
| 6,499,114 B1 | 12/2002 | Almstead et al. |
| 6,556,956 B1 | 4/2003 | Hunt |
| 6,594,620 B1 * | 7/2003 | Qin et al. ................... 702/185 |
| 6,823,675 B1 * | 11/2004 | Brunell et al. ................. 60/773 |
| 6,847,917 B1 * | 1/2005 | Bechhoefer ................. 702/183 |
| 2002/0087290 A1 * | 7/2002 | Wegerich et al. ........... 702/182 |
| 2003/0018394 A1 | 1/2003 | McCarthy et al. |

OTHER PUBLICATIONS

Gertler, J., Survey of Model-Based Failure Detection and Isolation in Complex Plants, 1988 IEEE.*

Balle et al., Fault Detection and Isolation for Nonlinear Processes Based on Local Linear Fuzzy Models and Parameter Estimation, 1998 AACC, pp. 1605-1609.*

* cited by examiner

SYSTEMS AND METHODS FOR SELECTING TRAINING DATA AND GENERATING FAULT MODELS FOR USE IN USE SENSOR-BASED MONITORING

This application claims benefit of U.S. provisional application 60,499,748 filed Sep. 3, 2003 and claims benefit of U.S. provisional application 60,499,749 filed Sep. 3, 2003 which claims benefit of provisional application 60/500,779 filed Sep. 5, 2003.

FIELD OF THE INVENTION

The present invention pertains to the field of sensor-based monitoring, and, more particularly, to the field of sensor based monitoring of power generating systems.

BACKGROUND OF THE INVENTION

Sensor-based monitoring can be used in a variety of industrial settings. Power generating systems, manufacturing processes, and a host of other industrial operations involving the coordinated functioning of large-scale, multi-component systems can all be efficiently controlled through sensor-based monitoring. Indeed, sensor-based monitoring can be advantageously employed in virtually any environment in which various system-specific parameters need to be monitored over time under different conditions.

The control of a system or process typically entails monitoring various physical indicators under different operating conditions, and can be facilitated by sensor-based monitoring. Monitored indicators can include temperature, pressure, flows of both inputs and outputs, and various other operating conditions. The physical indicators are typically monitored using one or more transducers or other type of sensors.

An example of a system with which sensor-based monitoring can be advantageously used is an electrical power generation system. The generation of electrical power typically involves a large-scale power generator such as a gas or steam turbine that converts mechanical energy into electrical energy through the process of electromagnetic induction to thereby provide an output of alternating electrical current. A power generator typically acts as reversed electric motor, in which a rotor carrying one or more coils is rotated within a magnetic field generated by an electromagnet. Important operating variables that should be closely monitored during the operation of a power generator include pressure and temperature in various regions of the power generator as well as the vibration of critical components. Accordingly, sensor-based monitoring is a particularly advantageous technique for monitoring the operation of a power generator.

Regardless of the setting in which it is used, a key task of sensor-based monitoring can be to evaluate data provided by a multitude of sensors. This can be done so as to detect and localize faults so that the faults can be corrected in a timely manner. With a power generating plant, in particular, the timely detection of faults can prevent equipment damage, reduce maintenance costs, and avoid costly, unplanned plant shut-downs.

Monitoring typically involves receiving sensor-supplied data, which can be mathematically represented in the form of sensor vectors. These sensor vectors provide data input into a model and are compared with estimated output values obtained by applying the model to the data input. Large deviations between the actual values of the sensor vectors and the estimated values generated by the model can indicate that a fault has occurred or is about to occur. Accordingly, accurate monitoring can depend critically on the accuracy of the model employed.

There are principally two approaches to constructing such a model. The first approach is referred to as principle or physical modeling, and involves constructing a largely deterministic model representing the physical phenomena that underlie the operation of a particular system or process. It can be the case, however, that the physical dimensions of the system are too numerous or too complex to lend themselves to an accurate representation using the physical model. Accordingly, it is sometimes necessary to resort to the second approach, that of statistical modeling. Sensor-based monitoring of a power generation system, largely because it can require the use of literally hundreds of sensors, can necessitate the construction of such a statistical model. Constructing a statistical model involves "training" a probabilistic model using historical data samples of the system. The purpose of training the model is to glean from the historical data the distribution of the sensor vectors when the system is operating normally.

An oft-overlooked fact with respect to conventional statistical modeling is that just as the actual monitoring depends critically on the accuracy of the model employed, so, in turn, the accuracy of the model depends critically on the data set used to train the model. Several drawbacks inherent in statistical modeling flow inevitably from difficulties associated with acquiring good data for training a model, especially in the context of monitoring a power generation system, for example.

Firstly, it is often not known whether there is a fault that has occurred during the training period in which data was collected. If there has been, then the inclusion of that data will obscure faults that may occur during actual testing or monitoring of a system or process.

Secondly, even if the training data is fault free, there can yet be large variations within the set of training data. This can occur if the data is collected during different modes of operation of a system. For example, in the context of a power generation system, the power generator can be operated in both a full-load (or base) mode as well as a part-load mode. Because these operating modes are sufficiently different, the resulting training data will likely exhibit significant variability. This makes the difficult task of modeling a complex sensor vector distribution with a single model all the more problematic.

Thirdly, the training data can include data generated during transition periods as the system transitions from one mode of operation to another. For example, in the context of a power generation system, data collected during the time period in which the power generator is in transition between states will inevitably reflect an other-than-normal physical state of the generator. Inclusion of such data among the set of training data, accordingly, can skew the resulting model.

Conventional models have typically been constructed using simple threshold rules, with different thresholds set for individual sensors. Models so constructed generally tend to neglect the inherent problems already described. They also tend to obscure the fact that constructing models using conventional techniques with data that has wide variability results in a second-best trade-off. This trade-off can necessitate a choice between relying on a limited, threshold-based model or, alternatively, constructing multiple models from a data set that excludes relevant data.

Accordingly, there is a need for a system and method directed to the selection of data for training a model, especially one that can be used for sensor-based monitoring of a power generator or similar type system. Moreover, there is a need for a system and method that addresses the problem of having to either construct a limited threshold-based model or construct multiple models on the basis of a reduced data set.

SUMMARY OF THE INVENTION

The present invention provides a system for generating a sensor model for use in sensor-based monitoring. The system can include a segmenting module that segments a collection of sensor vectors into a plurality of bins comprising distinct sensor vectors. The system can also include a set-generating module that generates a set of statistically significant sensor vectors for each of the bins. The, moreover, can also include a consistency determination module for generating at least one consistent set of sensor vectors from the sets of statistically significant sensor vectors. Additionally, the system can also include a model-generating module that generates a sensor model based upon the at least one consistent set.

The present invention also provides a system for generating statistically significant and consistent sets of training data that can be use in training a statistical model for purposes of sensor-based monitoring. The system can include a segmenting module for segmenting a plurality of sensor vectors into at least two different bins, each bin containing distinct sensor vectors. The system further can include a set-generating module. The set-generating module generates a first set by selecting and including in the first set at least one sensor vector from the first bin if the sensor vector from the first bin is statistically significant. The set-generating module also generates a second set by selecting and including in the second set at least one sensor vector from the second bin if the sensor vector from the second bin is statistically significant. The system further includes a consistency determination module for adding the second set to the first set if the second set is consistent with the first set.

A method aspect of the present invention pertains to a method for generating a sensor model for use in sensor-based monitoring. The method can include the step of segmenting a collection of sensor vectors into a plurality of bins comprising distinct sensor vectors. The method also can include the steps of generating a set of statistically significant sensor vectors for each bin, and generating at least one consistent set of sensor vectors from the sets of statistically significant sensor vectors. The system further can include the step of generating a sensor model based upon the at least one consistent set.

An additional method aspect of the present invention pertains to a method of selecting training data usable in generating a statistical model for purposes of sensor-based monitoring. The method can include the step of segmenting a plurality of sensor vectors into at least two distinct bins, each bin containing distinct sensor vectors. The method also can include the steps of generating a first set by selecting and including in the first set a sensor vector from the first bin if the sensor vector from the first bin is statistically significant, and generating a second set by selecting and including in the second set a sensor vector from the second bin if the sensor vector from the second bin is statistically significant. The method further includes the step of combining the second set with the first set if the second training-data set is consistent with the first set.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF PREFERRED EMBODIMENTS

The present invention provides a system 20 that performs two distinct functions related to sensor-based monitoring. The functions can be performed separately or jointly. First, the system 20 generates one or more unique sets of training data for training a non-deterministic sensor-based monitoring model. The training data contained in the one or more sets generated by the system 20 is characterized as being both statistically significant and consistent. Training data having these properties can be advantageously used with any of a number of distinct procedures for training a non-deterministic sensor-based monitoring model. Second, the system 20 generates one or more hybrid models. The system 20 generates one or more hybrid models by a unique clustering of available training data, the clustering being based on the statistical properties of the available training data.

Figure 1:
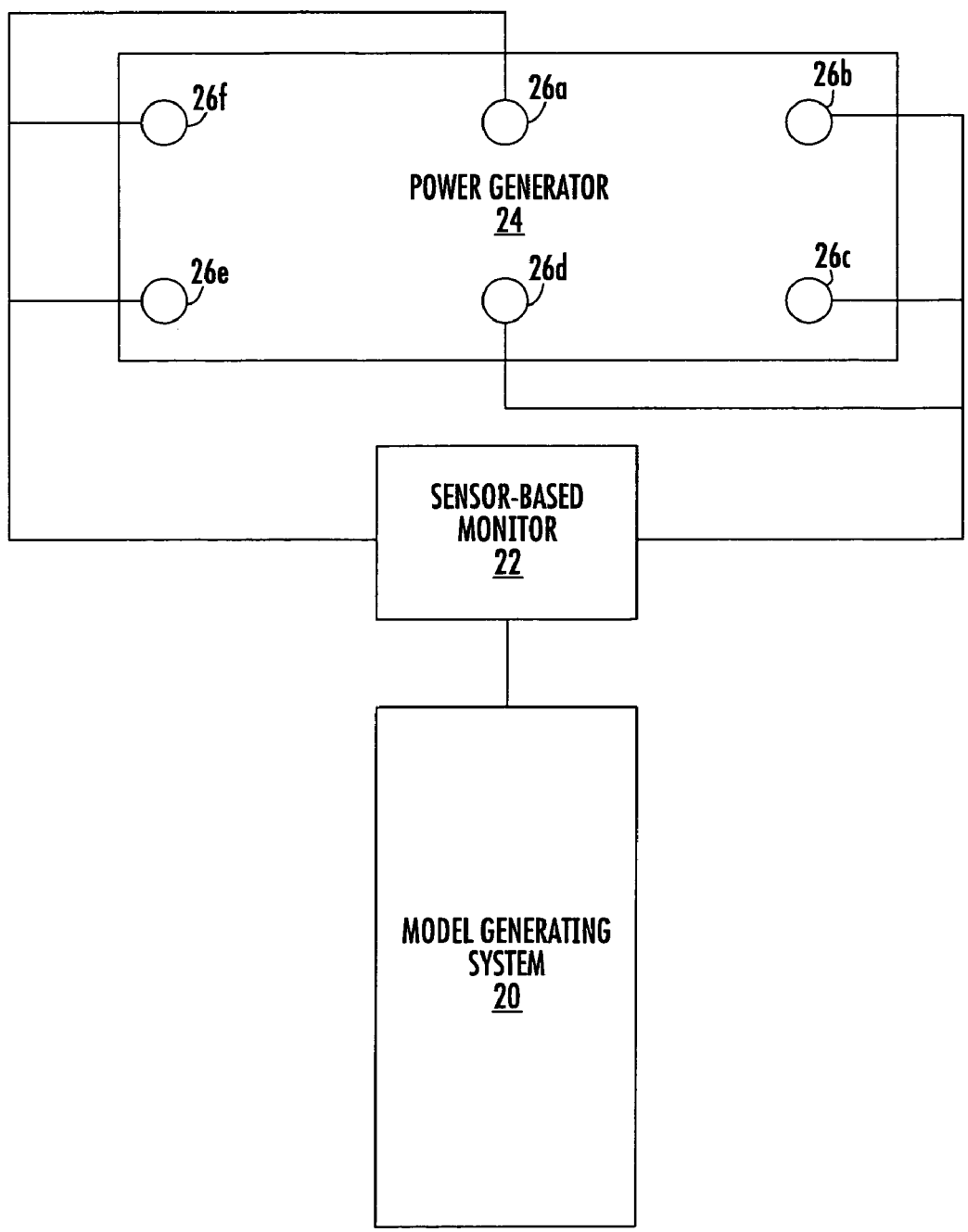
FIG. 1 is a schematic diagram of an electrical power generator monitored by sensor-based monitor, wherein the sensor-based monitor utilizes a system according to one embodiment of the present invention.

FIG. 1 provides a schematic diagram the system 20 according to one embodiment of the present invention, the system being used in conjunction with sensor-based monitor 22 for monitoring an electrical power generator 24. The system 20 illustratively connects to the sensor monitor 22, which, in turn, connects to a plurality of sensors 26a–f. The sensor 26a–f, as shown, are each connected to the power generator 26 for supplying sensing data to the sensor monitor 22. The power generator 24 as used in the present description is merely representative of the various types of devices and processes for which sensor-based monitoring can be facilitated by the system 20.

The system 20, as described in greater detail below, generates a sensor model that can be used by the sensor monitor 22 as the latter monitors the state of the power generator 24. More particularly, the sensor monitor 22 can use the model to detect faults that may occur in the power generator 24 by identifying data that, based on the model, indicates the power generator is not operating within a set of predefined parameters as would be expected were the power generator 24 functioning properly.

As illustrated, the system 20 can be implemented as a stand-alone device comprising dedicated circuitry for receiving and processing data derived from signals generated by the plurality of sensors 26a–f and received by the sensor monitor 22. The system 20, as shown, can be closely adjacent to the power generator 26 and/or the sensor monitor 22. Alternately, the system 20 can be removed from the vicinity of one or the other of the power generator 24 and sensor monitor 22. The system 20, also can communicate directly with the sensor monitor 22, or, alternately, can communicate with the sensor monitor through various types of data communications networks ranging from a local area network (LAN) to the Internet.

The system 20, though illustrated as a separate device can alternately be incorporated as circuitry within the sensor monitor 22. As will be readily understood by those of ordinary skill in the art, the circuitry can include logic gates, memory components, and/or data buses for implementing each of the functions described. Alternately, the system 20 can be implemented as software configured to run on a general purpose computer or on an application-specific device, including the sensor monitor 22 itself. Accordingly, the system 20 can be implemented in one or more hardwired circuits or in a software-based set of instructions for carrying out the functions described below. The system 20 also can be implemented in a combination of hardwired circuits and software-based instructions Virtually any number of sensors 26a–f can be employed, the number being practically limited only by the processing capacity of the circuitry used to implement the system 20 and sensor monitor 22. In practice, for example in monitoring a power generator or similar type plant, the actual sensors 24a–f are likely to number in the hundreds. A sensor 24a–f preferably is a transducer or similar type of device that, as readily understood by those of ordinary skill in the art, can generate a signal such as an electrical signal by converting energy from one form into another form. For example, one or more sensors can convert heat energy into an electrical signal so as to measure the temperature of the power generator in a selected region. Similarly, other sensors can be used to convert mechanical energy into an electrical signal so as to measure, for example, pressure in a selected region of the power generator. Still others can be used to generate electrical signals that indicate vibrations or rotations of components of the power generator. Accordingly, it will be readily appreciated that any of the various physical phenomena associated with the operation of a power plant or similar type device can be monitored using sensor-based monitoring.

Figure 2:
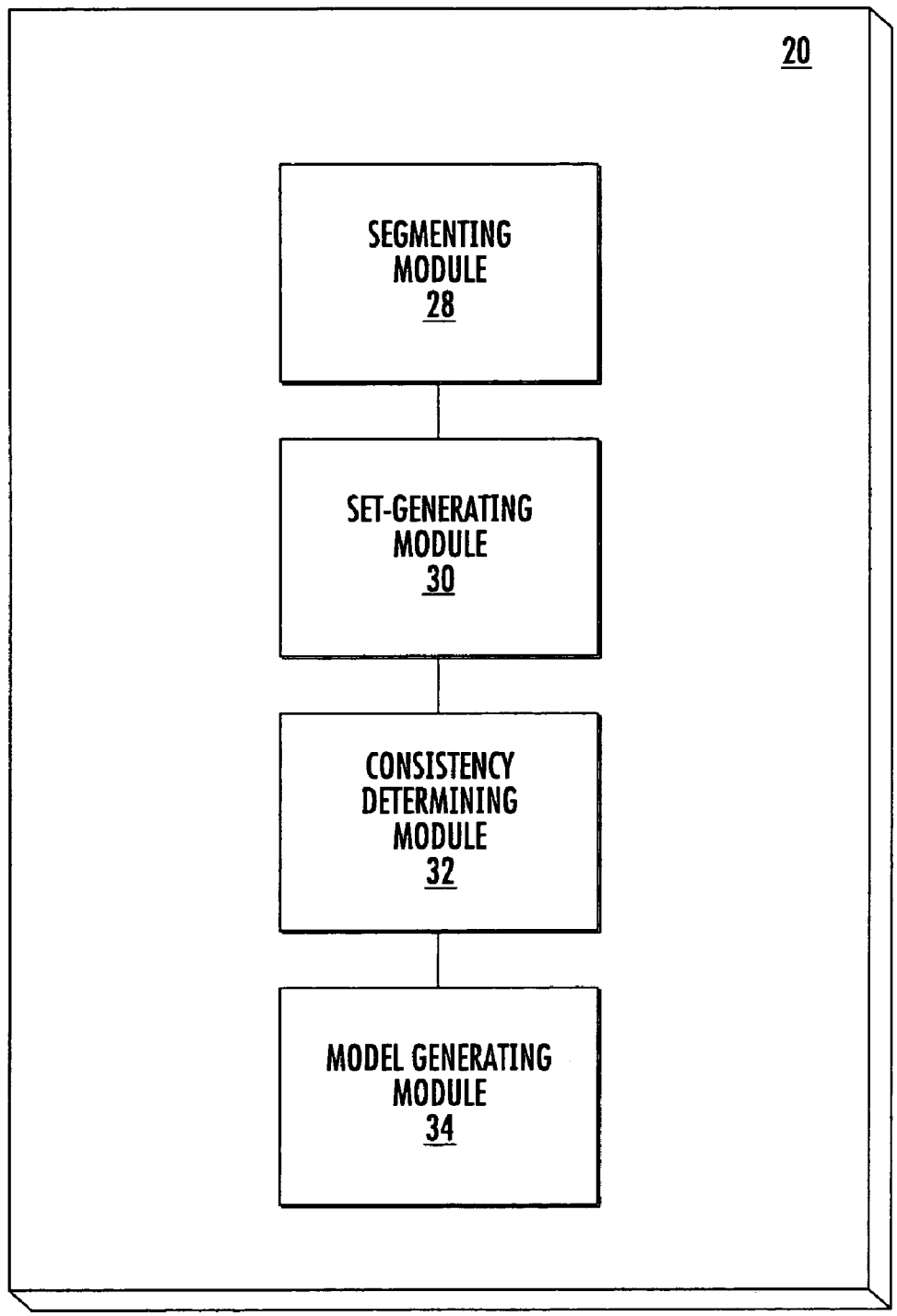
FIG. 2 is a schematic diagram of the system shown in FIG. 1.

Referring additionally now to FIG. 2, the system 20 illustratively includes a segmenting module 28 for segmenting a collection of sensor vectors into a plurality of bins, each bin containing distinct sensor vectors. As used herein, the term sensor vector denotes a mathematically-oriented representation of the data derived from the signals generated by the plurality of sensors 24a–f. Accordingly, a sensor vector is representative of the different data forms that can be employed by the system 20. Accordingly, a sensor vector can be an n-tuple or scalar, the values of which correspond to the sensor-supplied signals. For example, a simple sensor vector might be a 3-tuple, with the first element representing a temperature associated with the generator, the second element representing vibration within the generator's stator, and the third element representing the rotation of the rotor within the stator. As already noted, in practice, actual sensor vectors associated with power generation are likely to be n-tuples having many more than three elements.

The bins created by operation of the segmenting module 28 can be virtual bins, representing distinct sets of sensor vectors. The different sets of sensor vectors thus can correspond to different data collected at different times. In the context of power generation, the different data is likely to be collected, for example, over time periods that last several days in order to obtain a collection of training data that can be used to train a statistical model of the power generator as it operates under normal conditions.

In general, if d denotes the number of sensors used for monitoring a power generator, then d is the dimension of each sensor vector, and, thus, each sensor vector is d-tuple. The power generator 26 can be monitored by the sensor-based monitor 22 continuously over some time span, thereby generating a collection of sensor vectors, each having dimension d. The segmenting module 28 segments the collection of sensor vectors into discrete bins, each containing a different set of sensor vectors. Note that the number of sensor vectors per bin can be equal among all the bins so created. The computational burden of the procedures to be described hereafter can be eased somewhat by making the number of sensor vectors in each bin equal, but this is not necessary to the results achieved by the system 20. Accordingly, the number of sensor vectors for each bin can alternatively vary rather than being uniform.

To facilitate the description, however, let the number of sensor vectors in each bin generated by the segmenting module 28 be equal to N. Note that N can be a function of the size of the entire collection of sensor vectors, which, in turn, is a function of the duration of time over which the data was collected. The time duration is influenced by the time period that the power generator functions normally, because it is desirable to collect data that reflects the normal operating state of the power generator so that an accurate model can be "trained" using the collected data.

To further facilitate the description, assume herein that the segmenting module 28 segments the collection of sensor vectors into K bins. Let $D_k$ represent the $k^{th}$ bin, where k=1, 2, . . . , K. Each sensor vector is denoted herein as $x_{ki}$, where i=1, 2, . . ., N. Thus, as assumed above, the number of sensor vectors in each bin is taken to be uniform among all the bins.

As noted above in the context of the system 20 generally, the segmenting module 28 can be implemented using one or more dedicated circuits having analog and/or digital components, including one or more logic gates and memory elements connected by one or more buses or other signal-relaying connectors. Alternately, the segmenting module 28 can be implemented in one or more sets of software-based, machine-readable instructions configured to run on a general purpose computer or application-specific device. The segmenting module 28 also can be implemented in a combination of hardwired circuits and software-base instructions.

The system 20 further includes a set-generating module 30 for generating a set of statistically significant sensor vectors for each of the bins created by the segmenting module 28. The set-generating module 30 can generate a set of statistically significant sensors by determining, for each sensor vector in each bin, a likelihood that the sensor vector has a predefined probability distribution. For example, if the power generator 26 is operating normally and is stable throughout the time in which the data is collected, then a reasonable assumption is the each of the $x_{ki}$, i=1, 2, . . ., N, are identically and independently distributed, the specific distribution being a normal or Gaussian distribution.

Although, the embodiment described herein is based upon the stated assumption that the samples of sensor vectors in each bin have independent, identical Gaussian distributions, this assumption is not essential to the invention. Other distributions can be assumed. As will be readily understood by those of ordinary skill in the art, other distributions can be used when the operation of the particular system or process that is the basis of the model produces physical phenomena whose corresponding data have some distribution other than a Gaussian distribution. Moreover, as will also be readily understood by those of ordinary skill in the art, the law of large numbers can make the assumption of a normal or Gaussian distribution valid regardless of the underlying distribution of the data provided that the sample size, in terms of the number of sensor vectors in each bin, is sufficiently large. The manner in which the set-generating module 30 responds-to a small N is described below.

The set-generating module 30 is configured so as to compute the average of each element of the sensor vectors of the $k^{th}$ bin, and thereby generate a corresponding mean vector, $m_k$, for the $k^{th}$ bin. The set-generating module 30 is also configured to compute the pair-wise covariance for each pair of sensor vectors of the $k^{th}$ bin, from which the set-generating module 30 also generates a covariance matrix, $\Sigma_k$, for the $k^{th}$ bin. Under the above-stated assumptions regarding the normality of the $x_{ki}$ and the equal number of sensor vectors in each bin, it follows that the power generator 26 can be modeled by K N-member sets of sensor vectors having a Gaussian distribution with mean $m_k$ and covariance $\Sigma_k$, the distribution being concisely denoted as $N(m_k, \Sigma_k)$. If N is not sufficiently large with respect to d, then an estimate of $\Sigma_k$ can be obtained by simplifying the covariance matrix to be $\sigma_k^2 I$, where $\sigma_k$ is the variance of the sensor vectors of the $k^{th}$ bin and I is the identity matrix (a matrix whose diagonal elements are unity and whose off-diagonal elements are zero).

During a faulty period when the power generator 26 is not functioning within acceptable limits, or is in a transition state, the various $x_{ki}$ may not conform to the assumed Gaussian distribution. Accordingly, the set-generating module 30 generates a statistically significant set corresponding to each bin by culling from each bin only those sensor vectors that satisfy the stated assumption regarding the sensor vectors' underlying probability distribution. That is, for each bin, each sensor vector in the bin is tested by the set-generating module 30 to determine the likelihood that the sensor vector has the stated probability distribution.

If N is small, standard statistical tests such as the Kolmogorov-Smirnov test may not be appropriate for making the determination. Thus, according to one embodiment of the present invention, the set-generating module 30 performs a chi-squared test of normality in generating a set of statistically significant vectors for each bin. As is known, if the $x_{ki}$ have a Gaussian distribution, $N(m_k, \Sigma_k)$, then the statistic $y_{ki}=(x_{ki}-m_k)^T\Sigma_k^{-1}(x_{ki}-m_k)$ has a chi-squared distribution with d degrees of freedom. The test for each sensor vector in each bin is accordingly whether the statistic computed for each sensor vector satisfies the chi-squared test at a given confidence level.

Instead of rejecting all sensor vectors in a particular bin if one of the sensor vectors fails to satisfy the chi-squared test, the set-generating module 30 tests each sensor vector in each bin individually, keeping the statistically significant sensor vectors and discarding the rest.

The chi-squared test for determining statistical significance is illustratively implemented by the set-generating module 30 performing each of the following operations. First, the set-generating module 30 initializes the sensor vectors belonging to the $k^{th}$ bin, $X_k=\{x_{ki}\}$, i=1, 2, ..., N. The set-generating module 30 then computes a mean vector, $m_k$, and covariance matrix $\Sigma_k$ for the $k^{th}$ bin based upon the sensor vectors $X_k=\{x_{ki}\}$, belonging to the $k^{th}$ bin. Next, for each sensor vector, $x_{ki}$, contained in the set of sensor vectors, $X_k$, in the $k^{th}$ bin, the set-generating module 30 computes the above-described statistic $y_{ki}=(x_{ki}-m_k)^T\Sigma_k^{-1}(x_{ki}-m_k)$. The set-generating module 30 performs the chi-squared test by comparing $Y_{ki}$ to a predetermined threshold, $\rho$, where the threshold is pre-selected based upon a desired confidence level. Accordingly, if $y_{ki}<\rho$, then the corresponding $x_{ki}$ is deemed to be significant and included by the set-generating module 30 in $X_k'$, where $X_k'$ denotes the set of statistically significant sensor vectors for the $k^{th}$ bin. The complete set of statistically significant sensor vectors for the $k^{th}$ bin is thus obtained by performing these operations on each of the sensor vectors in the $k^{th}$ bin, $X_k=\{x_{ki}\}$, i=1, 2, ..., N.

The set-generating module 30 tests whether $\sigma_k<T_\sigma$, where $T_\sigma$ is a predefined threshold. If the inequality holds, then the set of statistically significant sensor vectors for the $k^{th}$ bin, $X_k'$, is deemed to satisfy the conditions for normality and is retained. Otherwise, the set of statistically significant sensor vectors for the $k^{th}$ bin, $X_k'$ is dropped. This last procedure operates to exclude a set of sensor vectors for which the $\sigma_k$ is undesirably large. This helps ensure, for example, that data collected when the power generator 26 is operating in a transition state are not included among the sets of training data generated for use in training the model.

By repeated application of the chi-squared test, the set-generating module 30 generates a training set for each bin. In particular, the set-generating module 30 generates a first training-data set by selecting and including in the first training-data set each sensor vector from the first bin that is statistically significant. Subsequently, the set generating module 30 generates a second training-data set by selecting and including in the second training-data set each sensor vector from the second bin that is statistically significant. The operation is repeated by the set-generating module 30 until each sensor vector of each bin has been tested. Accordingly, the set-generating module 30 generates a set of statistically significant sensor vectors for each bin.

As already discussed with respect to the system 20 generally and the segmenting module 28 specifically, the set-generating module 30 can be implemented in one or more dedicated circuits having analog and/or digital components that can include one or more logic gates and memory elements connected by one or more signal-relaying connectors. The set-generating module 30 alternatively can be implemented in one or more sets of software-based, machine-readable instructions configured to run on a general purpose computer or application-specific device. Additionally, the set-generating module also can be implemented in a combination of hardwired circuits and machine-readable, software-base instructions.

The system 20 additionally includes a consistency determination module 32 that generates at least one consistent set of sensor vectors from the sets of statistically significant sensor vectors generated by the set-generating module 30. Once an initial set of statistically significant sensor vectors for a bin has been generated by the set-generating module 30, then any succeeding set of statistically significant sensor vectors obtained from another bin is checked for consistency with the initial set by the consistency determination module 32. The consistency determination module 32 combines any two or more sets of statistically significant sensor vectors that are also consistent with one another.

By the iterative repetition of the set generating operations and the combining of statistically significant sets based upon consistency, the system 20 generates one or more statistically significant and consistent sets of sensor vectors. Since a set is consistent with itself, the system 20 accordingly generates at least one set of statistically significant and consistent sensor vectors, provided that at least one bin contains at least one statistically significant sensor vector.

According to one embodiment, the consistency determination module 32 deems two sets to be consistent if a squared difference between a first vector mean computed for the sensor vectors of one of the two sets and a second vector mean computed for the sensor vectors of the other of the two sets is less than a pre-selected threshold.

Thus, after a set of statistically significant sensor vectors $X_k'=\{x_{ki}'\}$ has been generated by the set generating module 30, the consistency determination module 32 determines the set's consistency with respect to any set of statistically significant sensor vectors already generated. If none has already been generated, then $X_k'$ is selected as the initial set, and a corresponding mean vector $m_k$ is computed based on the sensor vectors contained in $X_k'$. A mean vector, $w_c$, is selected based upon the $m_k$. Preferably, $w_c=m_k$, $c=1, 2, \ldots, C$, where $w_c$ denotes the mean vector of the statistically significant and consistent sets generated, and where C corresponds to the total number of physical states of the power generator 26.

The consistency determination model 32, according to one embodiment, determines whether a set of statistically significant sensor vectors $X_j$ is consistent by performing the following operations. A mean vector $m_j$ is determined based upon the statistically significant sensor vectors contained in $X_j$. The squared difference between $m_j$ and $w_c$, $|m_k-w_c|^2$, is then computed and its minimum over $c=1, 2, \ldots, C$ is determined. The minimum squared difference so determined is subsequently compared to a pre-determined consistency threshold, $T_m$. If the minimum squared difference is less than the consistency threshold, $T_m$, such that $$\min_{c=1,2,\ldots,C}\{|m_j-w_c|\}<T_m,$$

then the $X_j$ on which the mean vector $m_j$ is based is assigned by the. consistency determination module 32 to the state c*. Otherwise, the consistency determination module 32 does not combine $X_j$ with any existing set of statistically significant and consistent sensor vectors. If, however, $X_j$ is added by the consistency determination module 32 to an existing set, then the consistency determination module revises $w_{c*}$ based upon all the sensor vectors associated with state c*.

Accordingly, if there are multiple states, for each of which there exists a statistically significant and consistent set of sensor vectors as determined above, then it follows that there are multiple sets of statistically significant and consistent sensor vectors. The resulting one or more sets of statistically significant and consistent sets of sensor vectors provide the training data for training the model that can be used for sensor-based monitoring of the power generator 26.

As used herein, the training of a model connotes the building of a representative probabilistic model. More particularly, the model can be built using the training data in combination with various statistical techniques, including linear and non-linear regression, multivariate analysis, and non-parametric methods.

The consistency determination module 32 like the set-generating module 30 and the segmenting module 28 can be implemented in one or more dedicated circuits having analog and/or digital components, including one or more logic gates and memory elements connected by one or more signal-relaying connectors, or alternately in one or more sets of software-based, machine-readable instructions configured to run on a general purpose computer or application-specific device. The consistency determination module 32 similarly can be implemented in a combination of hardwired circuits and machine-readable, software-base instructions.

As noted above, the generation of sets of statistically significant and consistent sensors vectors is a distinct aspect of the present invention. The sensor vectors belonging to the one or more sets of statistically significant and consistent sensors vectors provide the training data for training a model, and accordingly can be used for training virtually any model. Another aspect of the present invention, however, pertains to the generation of a specific model for use in sensor-based monitoring.

Accordingly, the system 20 further includes a model-generating module 34 for generating a sensor model based upon at least one consistent set of sensor vectors as generated by cooperative operating of the set generating module 30 and the consistency determination module 32. If the set generating module 30 and the consistency determination module 32 have cooperatively generated at least one other consistent set as well, then the model-generating module 34 computes a minimum residual for this other consistent set using the sensor model already generated. That is, the model-generating module 34 computes an estimated sensor vector for each sensor vector belonging to the at least one other consistent set, and computes a residual based upon the absolute value of the difference between the estimated sensor vector and the corresponding actual sensor vector on which the estimated sensor vector is based. The model-generating module 34 then determines the smallest residual so computed, the smallest residual defining a minimum residual.

The model-generating module 34 combines the at least one consistent set with the at least one other consistent set, and replaces the sensor model with a revised sensor model based upon the combination, if the minimum residual is less than a pre-selected residual threshold. Otherwise, if the minimum residual is not less than the pre-selected threshold, then the model-generating module 34 constructs an additional sensor model based upon the at least one other consistent set. The procedure can be repeated by the module generating module 34 for each-additional consistent set that has also been cooperatively generated by the set-generating module 30 and the consistency determination module 32. The repetition continues until, for each consistent set, either the set has been combined with another set or a distinct model has been generated for the consistent set.

As with each of the other modules of the system 20, the model-generating module 34 can be implemented in one or more hardwired circuits utilizing analog and/or digital components, and including one or more logic gates and memory elements connected by one or more signal-relaying connectors. Alternatively, the model-generating module 34 can be implemented in one or more sets of software-based, machine-readable instructions configured to run on a general purpose computer or application-specific device. The model-generating module 34 also can be implemented in a combination of dedicated circuits and machine-readable, software-base instructions.

Figure 3:
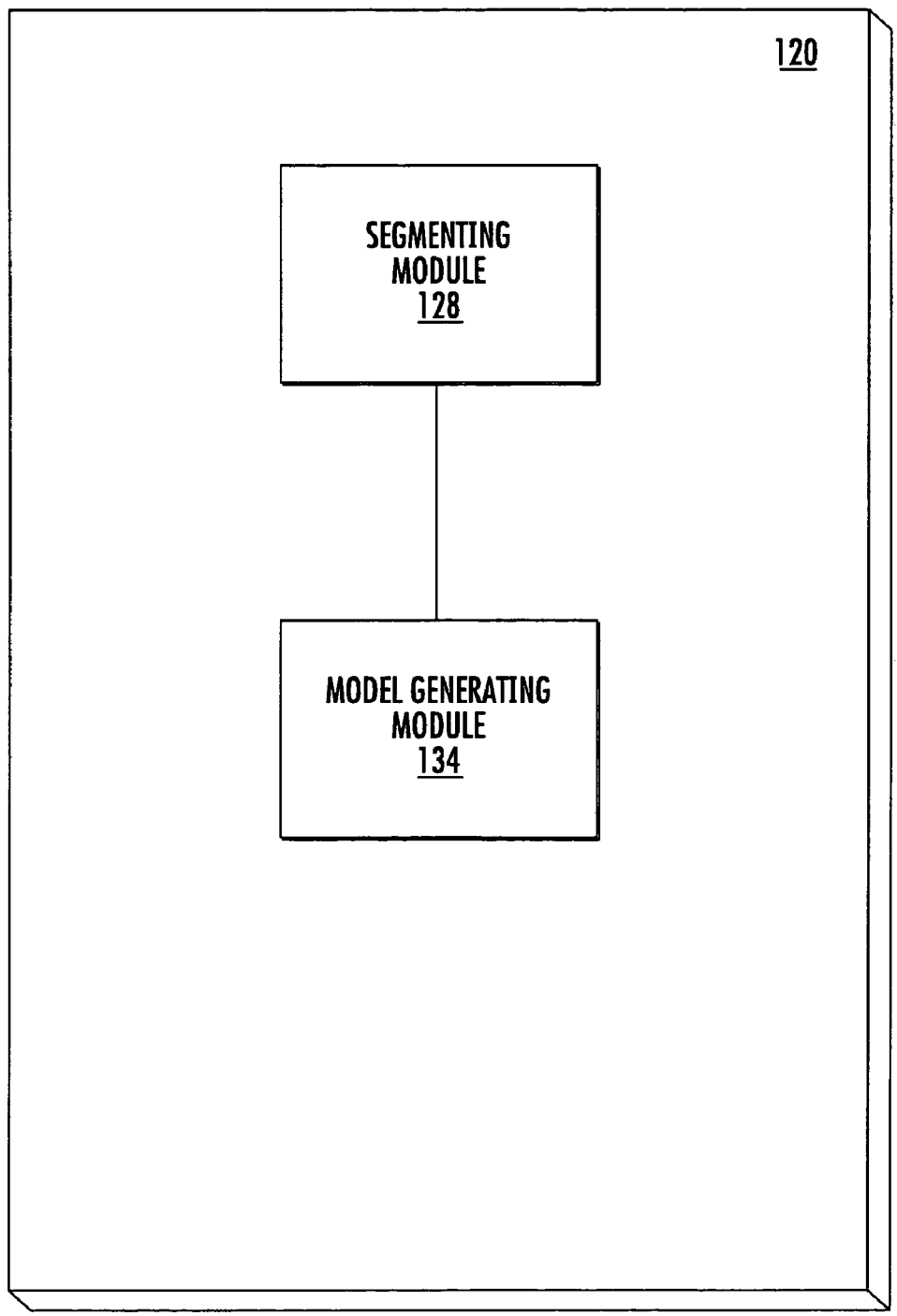
FIG. 3 is a schematic diagram of a system for use in sensor-based monitoring according to another embodiment of the present invention.

As stated above, the generation of a specific model for use in sensor-based monitoring is a distinct aspect of the invention, and it can be utilized with other types of training data other than that which is selected or obtained through the generation of sets of statistically significant and consistent sensor vectors. Accordingly, as illustrated in FIG. 3, an alternative embodiment of the present invention is a system 120 that includes a segmenting module 128 for segmenting a collection of sensor vectors into a plurality of bins. The system 120, according to this embodiment, also includes a model-generating module 134 for training one or more hybrid models, each hybrid being generated using certain of the sensor vectors belonging to one or more of the plurality of bins.

After the segmenting module 128 segments the collection of sensor vectors, the model-generating module 134 generates an initial model using the sensor vectors belonging to one of the plurality of bins. Having generated an initial model, the model-generating module 134 computes residuals for another of the plurality of bins, the residuals being determined using the initial model. If the minimum of the residuals is less than a pre-selected threshold, then the model-generating module 134 combines the sensor vectors for which the residuals were determined with the sensor vectors which were used to generate the model. Otherwise, the model-generating module 134 generates a new model based upon the sensor vectors for which the residuals were determined. The operations are iteratively repeated until the sensor vectors for each of the bins have either been combined with those of another bin or used to form a distinct model.

Figure 4:
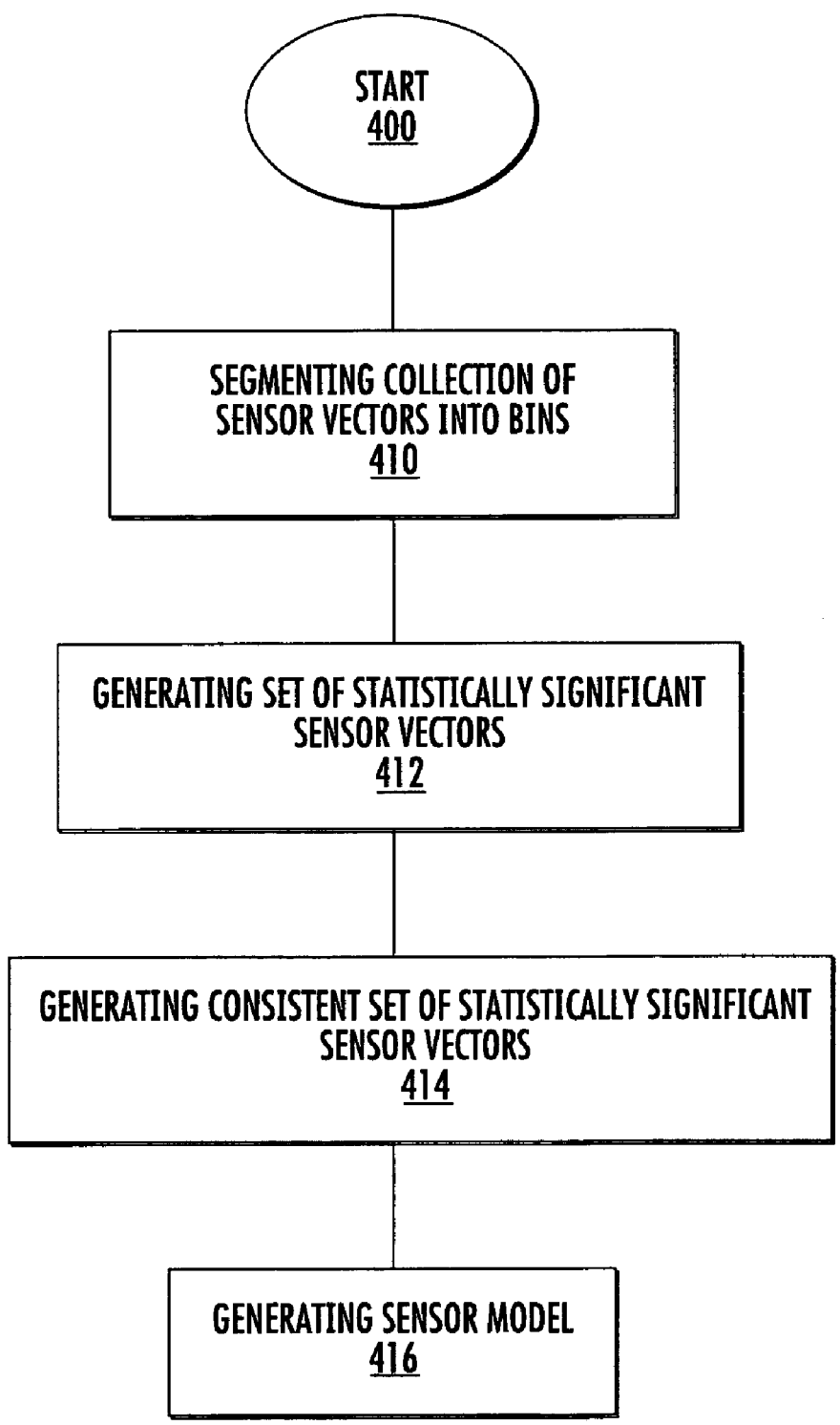
FIG. 4 provides a flowchart illustrative of a method of generating a non-deterministic model for sensor-based monitoring according to yet another embodiment of the present invention.

The method aspects of the present invention include a method for generating a sensor model for use in sensor-based monitoring. One embodiment of the method is illustrated in the flowchart provided in FIG. 4. The method 400 illustratively includes at step 410 segmenting a collection of sensor vectors into a plurality of bins comprising distinct sensor vectors. At step 412, a set of statistically significant sensor vectors is generated for each bin. The set of statistically significant sensor vectors is illustratively generated by determining, for each sensor vector in a bin, the likelihood that the sensor vector has a predefined probability distribution. The likelihood is illustratively based upon a chi-squared statistic.

The method 400 further includes at step 414 generating at least one consistent set of sensor vectors from the sets of statistically significant sensor vectors. The step of generating at least one consistent set illustratively includes combining at least two sets of statistically significant vectors if one of the two sets is consistent with the other. Two sets are consistent if a squared difference between a first mean vector computed for the sensor vectors of one of the two sets and a second mean vector computed for the sensor vectors of the other of the two sets is less than a pre-selected threshold. Finally, the method 400 includes at step 416 generating a sensor model based upon the at least one consistent set.

Figure 5:
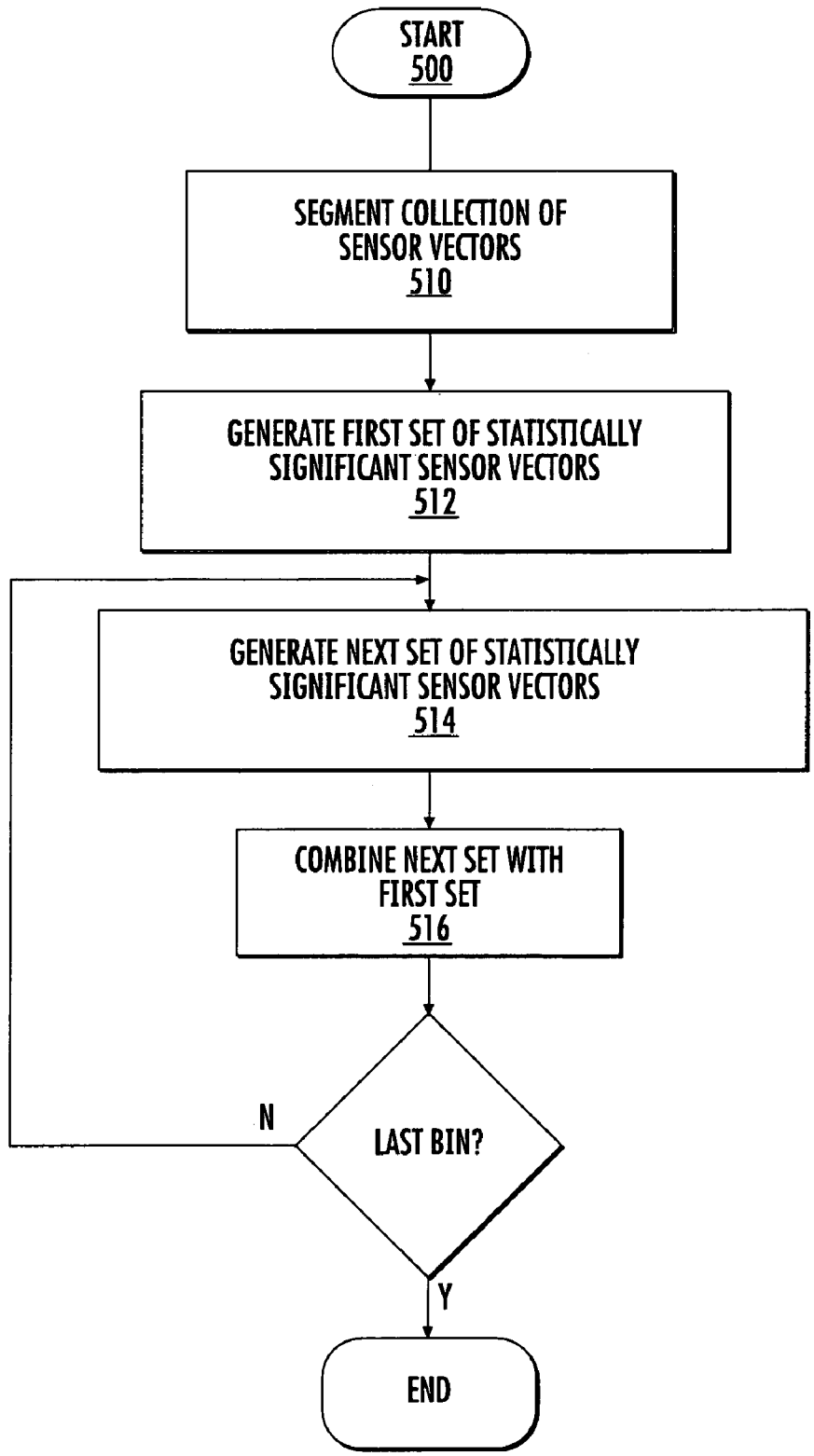
FIG. 5 provides a flowchart illustrative of a method of generating sets of statistically significant and consistent sensor vectors according to still another embodiment of the present invention.

An additional method aspect of the present invention pertains to a method of generating sets of training data usable for generating a statistical model for purposes of sensor-based monitoring. One embodiment of this aspect of the present invention is illustrated by the flowchart provided in FIG. 5. The method 500 illustratively includes at step 510 segmenting a plurality of sensor vectors into at least two different bins, each bin containing distinct sensor vectors.

The method further includes at step 512 generating a first set by selecting and including in the first set at least one sensor vector from the first bin if the sensor vector from the first bin is statistically significant. The method also includes at step 514 generating a second set by selecting and including in the second set at least one sensor vector from the second bin if the sensor vector from the second bin is statistically significant. The determination of whether a sensor vector is statistically significant according to this embodiment is based upon a likelihood that the sensor vector has a predefined probability distribution. The likelihood is illustratively based upon a chi-squared test of normality.

The method concludes at step 516 where combining the second set with the first set if the second set is consistent with the first training-data set. The step 516 of combining includes combining the second set with the first set only if a squared difference between a first vector mean based upon the first training-data set and second vector means based upon the second training-data set is less than a pre-selected threshold.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A system for generating a sensor model for use in sensor-based monitoring, the system comprising:
 a segmenting module for segmenting a collection of sensor vectors into a plurality of bins comprising distinct sensor vectors;
 a set-generating module for generating a set of statistically significant sensor vectors for each bin;
 a consistency determination module for generating at least one consistent set of sensor vectors from the sets of statistically significant sensor vectors; and
 a model-generating module for generating a sensor model based upon the at least one consistent set.

2. The system as in claim 1, wherein the set-generating module generates a set of statistically significant sensors by determining, for each sensor vector in each bin, a likelihood that the sensor vector has a predefined probability distribution.

3. The system as in claim 2, wherein the likelihood is based upon a chi-square statistic.

4. The system as in claim 1, wherein the consistency determination module combines two sets of statistically significant vectors if the two sets are consistent.

5. The system as in claim 4, wherein the two sets are consistent if a squared difference between a first vector mean computed for the sensor vectors of one of the two sets and a second vector mean computed for the sensor vectors of the other of the two sets is less than a pre-selected threshold.

6. The system as in claim 1, wherein the model-generating module:
 computes a minimum residual for at least one other consistent set using the sensor model, if the at least one consistent set comprises two or more consistent sets; and,
 if the at least one consistent set comprises two or more consistent sets, then combines the at least one consistent set with at least one other consistent set and replaces the sensor model with a revised sensor model based upon the combination, if the minimum residual is less than a pre-selected residual threshold; and constructs an additional sensor model based upon the at least one other consistent set, if the minimum residual is not less than the pre-selected threshold.

7. A system for generating statistically significant and consistent sets of training data usable in training a statistical model for purposes of sensor-based monitoring, the system comprising:

a segmenting module for segmenting a plurality of sensor vectors into at least two different bins, each bin containing distinct sensor vectors;

a set-generating module for generating a first set by selecting and including in the first set at least one sensor vector from the first bin if the sensor vector from the first bin is statistically significant, and generating a second set by selecting and including in the second set at least one sensor vector from the second bin if the sensor vector from the second bin is statistically significant; and a consistency determination module for adding the second set to the first set if the second set is consistent with the first set.

8. The system as in claim 7, wherein the set-generating module determines if a sensor vector is statistically significant based upon a likelihood that the sensor vector has a predefined probability distribution.

9. The system as in claim 8, wherein the likelihood is based upon a chi-squared test.

10. The system as in claim 7, wherein the consistency determination module combines the second set with the first set only if a squared difference between a first vector mean based upon the sensor vectors of the first set and a second vector mean based upon the sensor vectors of the second set is less than a pre-selected threshold.

11. A method for generating a sensor model for use in sensor-based monitoring, the method comprising the steps of:

segmenting a collection of sensor vectors into a plurality of bins comprising distinct sensor vectors;

generating a set of statistically significant sensor vectors for each bin;

generating at least one consistent set of sensor vectors from the sets of statistically significant sensor vectors; and generating a sensor model based upon the at least one consistent set.

12. The method as in claim 11, wherein the step of generating a set of statistically significant sensor vectors comprises determining, for each sensor vector in a bin, a likelihood that the sensor vector has a predefined probability distribution.

13. The method as in claim 12, wherein the likelihood is based upon a chi-square statistic.

14. The method as in claim 11, wherein the step of generating at least one consistent set comprises combining at least two sets of statistically significant vectors if one of the two sets is consistent with the other.

15. The method as in claim 14, wherein two sets are consistent if a squared difference between a first mean vector computed for the sensor vectors of one of the two sets and a second mean vector computed for the sensor vectors of the other of the two sets is less than a pre-selected threshold.

16. The method of claim 11, wherein the step of generating a sensor model based upon the at least one consistent set comprises:

computing a minimum residual for at least one other consistent set using the sensor model, if the at least one consistent set comprises two or more consistent sets; and, if the at least one consistent set comprises two or more consistent sets, then combining the at least one consistent set with at least one other consistent set and replacing the sensor model with a revised sensor model based upon the combination, if the minimum residual is less than a pre-selected residual threshold, and constructing an additional sensor model based upon the at least one other consistent set, if the minimum residual is not less than the pre-selected threshold.

17. A method of selecting training data usable in generating a statistical model for purposes of sensor-based monitoring, the method comprising the steps of:

segmenting a plurality of sensor vectors into at least two distinct bins, each bin containing distinct sensor vectors;

generating a first set by selecting and including in the first set a sensor vector from the first bin if the sensor vector from the first bin is statistically significant;

generating a second set by selecting and including in the second set a sensor vector from the second bin if the sensor vector from the second bin is statistically significant; and combining the second set with the first set if the second training-data set is consistent with the first set.

18. The method as in claim 17, wherein the step of generating a training data set comprises determining whether a sensor vector is statistically significant based upon a likelihood that the sensor vector has a predefined probability distribution.

19. The method as in claim 18, wherein the likelihood is based upon a chi-square test of normality.

20. The method as in claim 17, wherein the step of combining comprises combining the second set with the first set only if a squared difference between a first vector mean based upon the first set and second vector mean based upon the second set is less than a pre-selected threshold.

21. A computer-readable storage medium for use in sensor-based monitoring, the storage medium comprising computer instructions for:

segmenting training data comprising a plurality of sensor vectors into at least two distinct bins, each bin containing distinct sensor vectors;

generating a first set by selecting and including in the first set a sensor vector from the first bin if the sensor vector from the first bin is statistically significant;

generating a second set by selecting and including in the second set a sensor vector from the second bin if the sensor vector from the second bin is statistically significant; and forming a consistent set by combining the second training-data set with the first training-data set if the second training-data set is consistent with the first training-data set.

22. The computer-readable storage medium as in claim 21, further comprising a computer instruction for generating a sensor model based upon the consistent set.

* * * * *